United States Patent [19]

Andeen

[11] Patent Number: 4,679,402
[45] Date of Patent: Jul. 14, 1987

[54] COOLING HEAT EXCHANGER

[75] Inventor: Bruce R. Andeen, Acton, Mass.

[73] Assignee: Helix Technology Corporation, Waltham, Mass.

[21] Appl. No.: 895,268

[22] Filed: Aug. 11, 1986

[51] Int. Cl.$^4$ .............................................. B01D 8/00
[52] U.S. Cl. ...................................... 62/55.5; 55/269; 62/268; 62/515
[58] Field of Search ............ 62/55.5, 100, 268, 514 R, 62/6, 515; 417/901; 55/269

[56] References Cited

U.S. PATENT DOCUMENTS

| | | | |
|---|---|---|---|
| 3,175,373 | 3/1965 | Holkeboer et al. | 62/55.5 |
| 3,188,785 | 6/1965 | Butler | 62/55.5 |
| 3,279,211 | 10/1966 | Merrick | 62/515 |
| 3,423,947 | 1/1969 | Moriya | 62/55.5 |
| 4,479,927 | 10/1984 | Gelernt | 62/55.5 |
| 4,506,513 | 3/1985 | Max | 62/55.5 |
| 4,537,927 | 8/1985 | Kamil | 62/514 R |
| 4,541,249 | 9/1985 | Graves et al. | 62/55.5 |

Primary Examiner—Ronald C. Capossela
Attorney, Agent, or Firm—Hamilton, Brook, Smith & Reynolds

[57] ABSTRACT

A cooling heat exchanger such as a cold trap for removing contaminants from a vapor stream. Vapor flows through a conduit having angled baffles therein. The baffles are aligned within the conduit so as to form an optically dense trap. A cold region is created by placing a cold finger of a cryogenic refrigerator in contact with a sleeve surrounding the conduit adjacent to the baffles. Insulation of the cold region to maintain cryogenic temperatures is accomplished by insulation within an insulating container surrounding the cold region.

20 Claims, 2 Drawing Figures

COOLING HEAT EXCHANGER

BACKGROUND

A cooling heat exchanger such as a cold trap is typically used in vacuum systems to remove gases having a relatively high temperature of solidification, or sometimes liquefaction, from a gas with a lower temperature of solidification. Generally, gaseous or particulate contaminants are removed from a vapor stream flowing through the cold trap. For example, a cold trap is often used to remove aluminum chloride in a reactive ion etching system.

A cold trap captures contaminants by providing a cold surface in the flow path of the particle. Particles which strike the cold surface are immobilized by freezing onto or by adsorption into the cold surface. To insure that all of the contaminants collide with the cold surface, chevrons or simple baffle arrangements are used for obstructing the traveling path.

In order to create a cold surface or cold region sufficient to trap contaminant gases, cryogenic temperatures are needed. Typically, a coolant such as liquid nitrogen or a dry-ice-acetone mixture is placed in contact with the region that is to be cooled. Using these types of coolants, however, require special hardware for circulating or replenishing the liquid coolant.

For an efficient cooling system the coolant is insulated to prevent heat transfer to the ambient enclosure. Conventionally, a vacuum chamber surrounding the coolant is used for insulation. This, however, adds hardware to the system to create the vacuum as well as a concern for leaks in the vacuum chamber. Such systems can be expensive and cumbersome.

Therefore, there is a need for a cold trap which can be used to remove contaminants more efficiently, economically, and conveniently.

DISCLOSURE OF THE INVENTION

The invention relates to a cooling heat exchanger used as a cold trap for removing contaminant gases, but is not limited to only that application. The embodiment described may also serve as a fluid heat exchanger.

In the preferred embodiment the exchanger comprises a flow-through conduit having baffles located therein. In thermal contact with the baffles is a cold end of a cryogenic refrigerator. In order to produce cryogenic temperatures on the surface of the baffles, the heat load to be overcome by the refrigerator is minimized by placing a container around the conduit such that an insulating volume is created.

Preferably, the conduit is made of low thermal conductivity material to reduce the conduction of heat from the ends of the conduit to the baffles, thus increasing the temperature differential. In order to uniformly distribute the cryogenic temperature to the baffles, it is preferred that a sleeve of high thermal conductivity material surrounding a center portion of the conduit be placed adjacent to the baffles such that it is in close thermal contact with them. Further, it is preferred that the insulating volume surrounding the conduit be filled with insulation such as foam or fiberglass.

When a cooling heat exchanger is used as a cold trap, the exchanger must be serviced from time to time in order to clean the trap contaminates collected. In order to facilitate cleaning, it is preferred that a heating tape be wrapped around the sleeve to decrease the time necessary to warm the trap to ambient temperatures. It is also preferred that the baffles are angled to facilitate draining when the trap is rinsed clean.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refers to the same parts throughout the different views. The drawings are not necessarily to scale, emphasis instead being placed upon illustrating the principles of the invention.

DETAILED DESCRIPTION OF THE INVENTION

The present invention is directed to an apparatus such as a cold trap 10 for trapping contaminants produced by a reactive ion etching system. The system makes use of the cold trap 10 which has a cold surface for removing contaminants from gas as it flows from a ion etcher 12 toward a mechanical roughing pump. Other applications for this invention such as a fluid heat exchanger are also possible.

Figure 1:
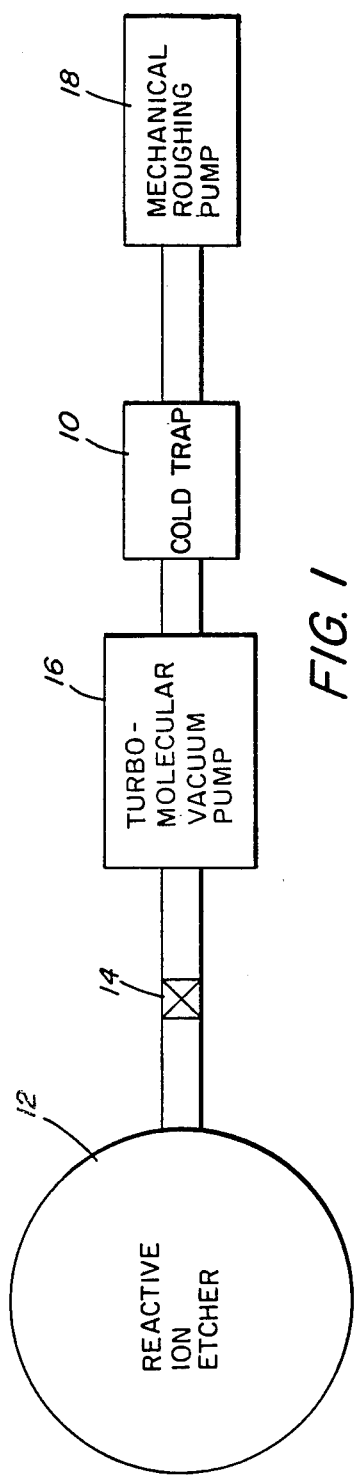
FIG. 1 is an illustrative diagram of a reactive ion etching system.

Embodied in FIG. 1, is a typical reactive ion etching system. A vacuum is created in the etcher 12 by a turbomolecular vacuum pump 16 through a valve 14. In the etcher, noxious contaminants may be produced and withdrawn by the pump 16. From the pump 16, the gases enter the cold trap 10 where contaminant gases or particles are to be removed from the system. While flowing through the cold trap, contaminating vapor such as aluminum chloride gives up energy when it collides with a cold surface within the cold trap. As a result, the aluminum chloride condenses and collects on the cold surface thereby removing it from the flowing gases. The purified gases are withdrawn from the cold trap 10 by a mechanical roughing pump 18.

Figure 2:
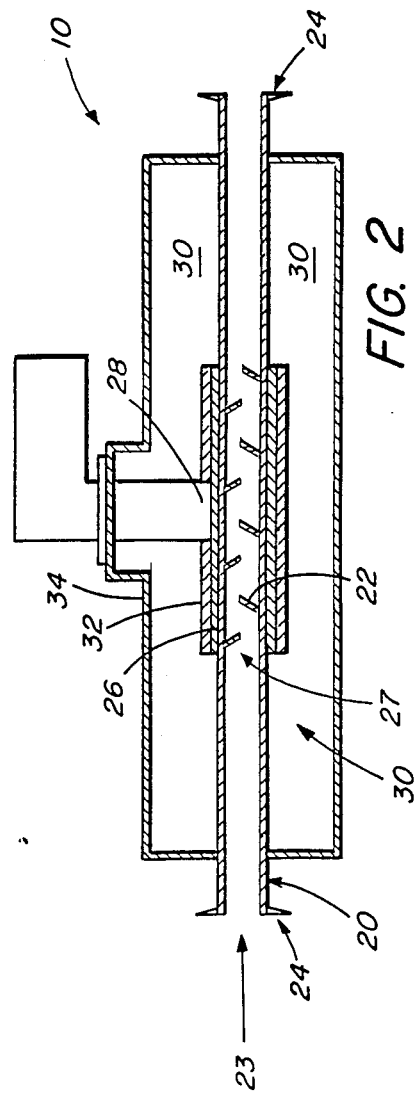
FIG. 2 is a longitudinal sectional view of the cold trap of FIG. 1 embodying the present invention.

In FIG. 2, a longitudinal section of the cold trap is shown. The device includes a conduit 20 with baffles 22 located therein. On each end of the conduit there is a flange 24. The flange 24 facilitates coupling and decoupling of the conduit 20 to the system. Preferably, the conduit is made from a material having poor thermal conduction. This characteristic allows for a greater temperature gradient between the outside of the cold trap and the inner cold, cryogenic surfaces used for trapping contaminates. Further, it is preferred that the required conduit and the baffles are made of a non-reactive material such as 316L stainless steel, a low carbon alloy of steel. If a non-inert material were used, decay may result when gases are passed through the cold trap.

The baffles 22 located within the cold region 27 of the conduit 20 are preferably flat plates which angle away from the input end 23 of the conduit 20. The surfaces of the flat plates are at cryogenic temperatures and are used for trapping vapor contaminates. Preferably, the baffles 22 extend at least to the axial center of the conduit 20 to provide a trap which is optically dense or non-transparent when looking through it. Other means for providing an optically dense conduit such as making an s-curved tube or putting an elbow in the conduit are possible. By constructing an optically dense trap, gases flowing through the cold trap are forced to hit the cold surfaces of the baffles. If an optically dense conduit was not used, contaminant might flow through the conduit without striking a cold surface and, thus, flow through without being trapped.

Surrounding the tube 20 adjacent to the baffles 22 is a sleeve 26. The sleeve 26 is used to create the cold trapping region 27 of the conduit 20 and should be made from a material such as copper having high thermal conductivity. In thermal contact with this sleeve 26 is a cold finger 28 from a closed cycle cryogenic refrigerator such as a Gifford-MacMahon or a Stirling refrigerator. Such a refrigerator typically includes a piston, which may be a displacer having a regenerative matrix therein, which reciprocates within the cold finger cylinder. Expansion of refrigerant gas such as helium in an expansion space at the furthest end of the cold finger reduces that end of the cold finger to cryogenic temperatures typically less than 130 K. From the sleeve, the cold finger 28 extends through an insulating container 34 which forms an insulating volume 30 around the tube 20.

During operation, the cold finger 28 conducts cryogenic temperatures generated by the refrigerator to the sleeve 26 through the tube 20, to the baffles 22. The long, thin tube 20 of low thermal conductivity provides a low conductance path from the refrigerator to the environment. The wide, short path between the sleeve and the baffles, on the other hand, is of good conductance despite the low thermal conductivity. The sleeve 26 serves as a heat sink in close thermal contact, through the tube 20, with the baffles 22. With its high thermal conductivity, the sleeve uniformly distributes the cyrogenic temperatures of the refrigerator along the length of tube 20 in which gas is trapped.

In the past, it was believed that in order to sustain cryogenic temperatures within the cold trap, a vacuum surrounding the cold region was required to reduce the heat load. I have found that the insulating volume 30 may also be filled with an insulating material such as fiberglass or expanded foam to obtain and sustain the cryogenic temperatures necessary for trapping. The advantage of insulating the cold trap in this manner is that it avoids the hardware and maintenance associated with conventional methods used to create a vacuum for insulation. Additionally, using fiberglass or expanded foam for insulation also eliminates the concern for producing vacuum containers free of leaks. Thus, a more efficient and economical cold trap is provided.

From time to time, the cold trap must be removed and cleaned of contaminants which collect on the cold surfaces. In order to reduce the time it takes to warm the cold trap 10 to ambient temperatures a strip of heat tape 32 is wrapped around the sleeve 26. The heat tape may be an electrical device which conducts heat from wires which have been wrapped around and taped to the sleeve. Once the cold trap 10 has warmed to ambient temperature, the trap can be quickly removed and cleaned. Conventionally in ion etching systems, warm water is flushed through the cold trap 10 to remove any debris collected by the cold trap. With the baffles obliquely angled relative to the conduit, water is more easily drained from the cold trap after it has been washed.

The present invention eliminates the need for a liquid coolant and reduces the hardware necessary to produce cryogenic temperatures used to trap contaminants in the conventional system. Thus, a more efficient means for cooling the cold region is possible. Also, the present construction is cheaper and easier to manufacture.

While this invention has been particularly shown and described with reference to preferred embodiments thereof, it will be understood by those skilled in the art that various changes in form and details may be made without departing from the spirit and scope of the invention as defined in the appended claims. For example, the construction described above could be used as a heat exchanger.

I claim:

1. A cooling heat exchanger assembly, comprising:
   a. a flow through conduit of low thermal conductivity material;
   b. an optically dense center portion of the conduit;
   c. a container surrounding the conduit such that an insulating volume filled with solid insulation is created between the conduit and the container; and
   d. a cryogenic refrigerator having a piston which reciprocates in a cylinder to expand and thus cool gas in an expansion space at the end of the cylinder, the cylinder extending through the container such that its cold end is in thermal contact with the conduit.

2. A cooling heat exchanger assembly as claimed in claim 1, further comprising a sleeve of high thermal conductivity material which is in close thermal contact with the cold end of the refrigerator and which surrounds the center portion of the conduit adjacent to the baffles such that it is in close thermal contact with the optically dense center portion.

3. A cooling heat exchanger assembly as claimed in claim 1, wherein the cooling heat exchanger is a cold trap.

4. A cooling heat exchanger assembly as claimed in claim 3, further comprising a sleeve of high thermal conductivity material which is in close thermal contact with the cold end of the refrigerator and which surrounds the center portion of the conduit adjacent to the baffles such that it is in close thermal contact with the optically dense center portion.

5. A cooling heat exchanger assembly as claimed in claim 1, further comprising a heat tape wrapped around the sleeve.

6. A cooling heat exchanger assembly as claimed in claim 1, wherein baffles are located in the center portion of the conduit.

7. A cooling heat exchanger assembly as claimed in claim 6, wherein the baffles are obliquely angled relative to the conduit.

8. A cooling heat exchanger assembly as claimed in claim 1, wherein the solid insulation is fiberglass.

9. A cooling heat exchanger assembly as claimed in claim 1, wherein the solid insulation is expanded foam.

10. A cooling heat exchanger assembly comprising:
    a. a flow through conduit of low thermal conductivity material;
    b. baffles located within a center portion of the conduit;
    c. a sleeve of high thermal conductivity material adjacent to and in close thermal contact with the baffles;
    d. a container surrounding the conduit and the sleeve such that an insulating volume is created between the conduit and the container; and
    e. a cryogenic refrigerator having a piston which reciprocates in a cylinder to expand and thus cool gas in an expansion space at the end of the cylinder, the cylinder extending through the container such that its cold end is in thermal contact with the sleeve.

11. A cooling heat exchanger assembly as claimed in claim 10, wherein the cooling heat exchanger is a cold trap.

12. A cooling heat exchanger assembly as claimed in claim 10, further comprising a heat tape wrapped around the sleeve.

13. A cooling heat exchanger assembly as claimed in claim 10, wherein the baffles are obliquely angled relative to the conduit.

14. A cooling head exchanger assembly as claimed in claim 10, wherein the solid insulation is fiberglass.

15. A cooling head exchanger assembly as claimed in claim 10, wherein the solid insulation is expanded foam.

16. A cold trap comprising:
   a. a flow through conduit of low thermal conductivity material;
   b. baffles located within the conduit;
   c. a sleeve of high thermal conductivity material adjacent to and in close thermal contact with the baffles;
   d. a container surrounding the conduit and sleeve such that an insulating volume filled with solid insulation is created between the conduit and the container; and
   e. a cryogenic refrigerator having a piston which reciprocates in a cylinder to expand and thus cool gas in an expansion space at the end of the cylinder, the cylinder extending through the container such that its cold end is in thermal contact with the sleeve.

17. A cold trap as claimed in claim 16, further comprising a heat tape wrapped around the sleeve.

18. A cold trap as claimed in claim 16, wherein the baffles are obliquely angled relative to the conduit.

19. A cold trap as claimed in claim 16, wherein the solid insulation is fiberglass.

20. A cold trap as claimed in claim 16, wherein the solid insulation is expanded foam.

* * * * *